No. 674,542. Patented May 21, 1901.
W. SCHULTE.
LATHE.
(Application filed Oct. 5, 1900.)
(No Model.)

Witnesses.
Hans Brenner
[signature]

Inventor.
Wilhelm Schulte
per Gerson & Sachs
Attorneys.

THE NORRIS PETERS CO., PHOTO-LITHO., WASHINGTON, D. C.

UNITED STATES PATENT OFFICE.

WILHELM SCHULTE, OF LÜDENSCHEID, GERMANY.

LATHE.

SPECIFICATION forming part of Letters Patent No. 674,542, dated May 21, 1901.

Application filed October 5, 1900. Serial No. 32,174. (No model.)

*To all whom it may concern:*

Be it known that I, WILHELM SCHULTE, a subject of the Emperor of Germany, residing at 6 Sedanstrasse, Lüdenscheid, German Empire, have invented a new and useful Lathe, of which the following is a specification.

My invention consists of a new and useful lathe of novel construction by means of which closed curved designs can be easily formed out of pieces of metal, wood, &c., and which invention is clearly described and set forth in the following specification.

Figure 1:
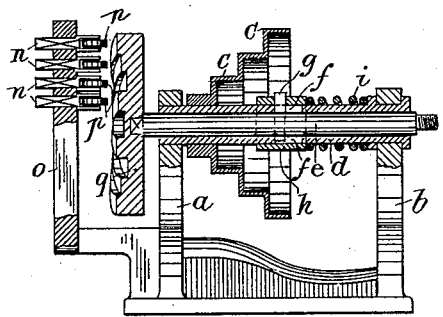
Figure 2:
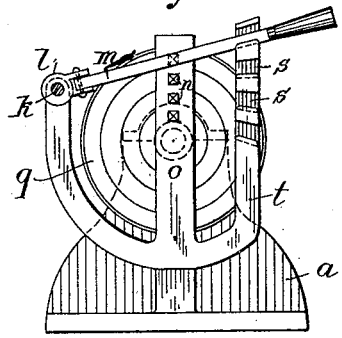
Figure 3:
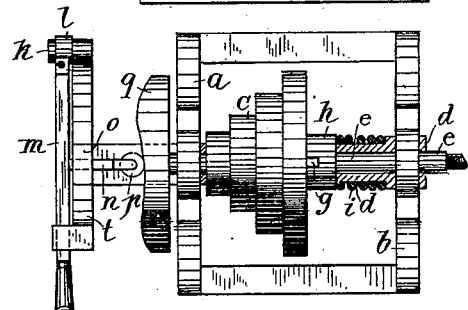
Figure 4:
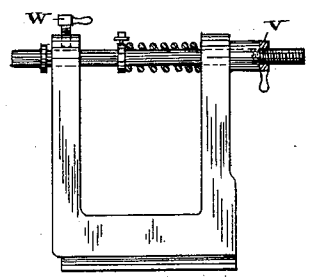
Figure 5:
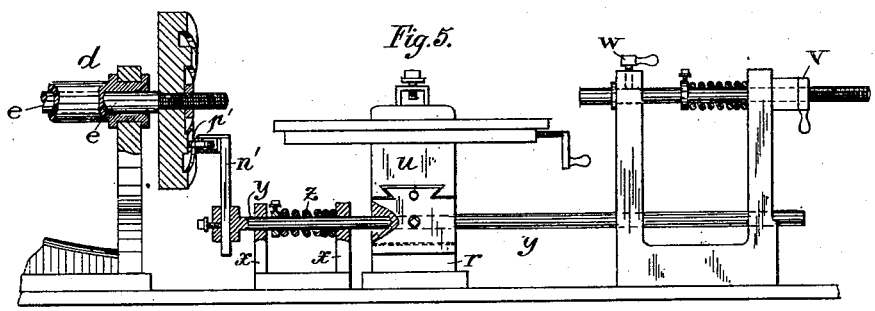
Figure 6:
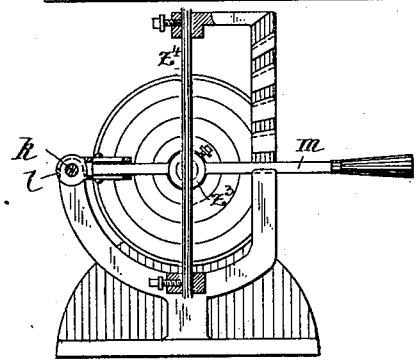
Figure 7:
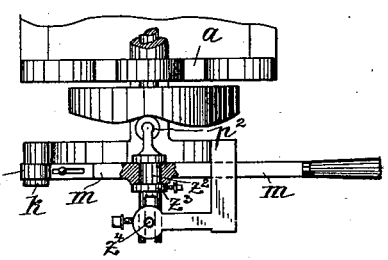

In the accompanying drawings, in which similar letters refer throughout to similar parts, Figure 1 is a side elevation, in partial section, of a lathe embodying my invention; Fig. 2, an end view of Fig. 1. Fig. 3 is a plan view of Fig. 1; Fig. 4, a detail of lathe not shown in Figs. 1 to 3. Figs. 5, 6, and 7 illustrate modifications of the device.

In the construction of my invention I employ a frame or support formed of standards $a$ and $b$, securely braced and adapted to be mounted upon a lathe-frame. The upper ends of these standards are provided with registering openings or bearings in which is journaled a hollow rotatable shaft $d$, carrying the belting-wheels $c$ thereupon. Snugly fitting within said shaft $d$ and extending beyond each end of the same is an axle $e$, which is connected with shaft $d$ aforesaid, so as to rotate therewith as the said shaft is driven by the belting, but still retaining a free longitudinal or sliding movement to and fro through the said shaft. Such connection is made by a ring $h$, loosely mounted upon shaft $d$ and connected with a pin $g$, passing through an elongated slot $f$, formed in shaft $d$ with said axle $e$. By this means axle and shaft revolve together; but the axle may have simultaneously therewith a reciprocating motion, as more fully hereinafter described. Surrounding said shaft $d$ is a spiral spring $i$, resting at one end against the standard $b$ and at its other against ring $h$, thereby serving to hold the axle in a forward position within the shaft $d$. Secured to the head of the device—that is, to standard $a$—is an arm diverging into three forks, (see Fig. 2,) in the rear one of which a pivot $k$ is mounted. On said pivot is turnable a split ring or clamp $l$, between whose jaws a lever $m$ is pivoted, thus allowing said lever to swing up and down or in and out. Mounted in the middle fork-prong $o$ are a plurality of pins $n$, whose ends projecting on each side through the prong $o$ carry each on that end adjacent standard $a$ a wheel $p$ and whose opposite ends are adapted to be alternately engaged by lever $m$. (See Fig. 2.) A rack is formed out of the fork-prong $t$ by slots $s$, by means of which said lever can be secured in any desired position—that is, so as to engage any one of the said pins $n$. Mounted on the forward end of axle $e$ is a disk $q$, on whose face a plurality of circular paths are formed, each path having a predetermined contour (see Fig. 3) and in each of which one of said wheels $p$ is adapted to travel, thereby giving, with aid of the forward-forcing spring $i$, the axle $e$ a reciprocating movement corresponding in degree to that of the varying elevations and depressions formed in the circular path aforesaid.

The metal or wood piece to be worked may be secured to the end of axle $e$ opposite to that end carrying said disk and the working or cutting tool guided thereagainst, as in any lathe. When, however, the said work-piece is of considerable length, then I mount the same between the projecting end of axle $e$ and the usual sliding puppet, (see Fig. 4,) as with other lathes, with the exception, however, that the sliding puppet has its body loosely mounted and under the influence of a spring, so that it moves exactly with axle $e$ in its reciprocal movements. A set-screw $w$ and adjusting-screw $v$ provide means for adjusting and controlling the movement of the sliding puppet as desired. In either case, however, it is obvious that the work-piece is rotated and reciprocated simultaneously, so that the working tool cuts or forms a desired design upon its surface, and that the tool returns, no matter what the degree of reciprocation, to its starting-point at the completion of each revolution, thus forming a closed curved design. In place, however, of giving the work-piece a reciprocal movement in combination with a rotatable one, I may give it simply a rotating movement and direct the reciprocation into the tool itself, as shown in Fig. 5. In this case I mount the disk $q'$, on whose face the various paths are formed and which disk I call for purpose of distinction a "graded cam," on the inner end of axle $e$. (See Fig. 5.) The tool-bearer $u$ is mounted on a sliding block $r$, to which a rod $y$ is fastened. This rod may be guided in the sliding puppet, and has its forward end mounted in a bearing $x\,x$, and which forward end carries a small chuck in which a pin $n'$ may be quickly secured, and which pin carries a wheel $p'$, adapted to engage in any desired one of said paths on said graded cam through pressure of a spring $z$, thus giving the tool a reciprocal or sliding movement to and fro on the lathe-bed. Said cam $q'$ is secured in position by a nut engaging a screw-thread formed on the end of axle $e$ for this purpose. It is obvious that the cams in both cases can be easily removed and others substituted having differently-graded paths, so that any desired designs may be formed. I may, if found desirable, secure a graded cam on each end of said axle $e$ in connection with the constructions shown in Figs. 1 and 5, thereby giving both the work-piece and the tool simultaneously a reciprocation, in which case an entirely different design is obtained.

Figs. 6 and 7 show another modification, in which the jaws of the split ring $l$ on pivot $k$ are elongated and slotted, so as to allow a free longitudinal movement to the pivot-pin of lever $m$, which lever is provided with an eye receiving a pivot $z^2$, secured to said eye by a ring $z^3$. Said pivot $z^2$ carries a wheel $p^2$ and has a slotted outer end, by means of which it is guided on a vertical bar $z^4$, secured to the lathe-frame, as shown. With this arrangement only a single wheel $p^2$ is required, engaging alternately the various paths on said disk.

In all cases it is obvious that through the graded cam the work-piece and tool are brought together, so that as the work-piece is revolved a curved design is formed on the same, but that in all cases the curve is closed—that is, the working tool is brought back, after tracing any given curve upon the work-piece, to the starting-point.

What I claim as my invention, and desire to secure by Letters Patent, is—

1. In a new and useful lathe the combination of a shaft, an axle therein, a disk on the end thereof provided with a plurality of concentrically-arranged paths of varying depths, pins, wheels on said pins and adapted to be thrown into contact with certain of said paths, so that as the said axle rotates it receives a reciprocating movement being forced back and forth according to the depth or elevation of said paths, substantially as described.

2. In a new and useful lathe, the combination of a rotatable hollow shaft provided with an elongated slot, an axle within said shaft, a ring surrounding said shaft, a pin connecting said axle and ring and passing through said slot, a spring surrounding said shaft and engaging said ring and means for giving said axle a reciprocal movement simultaneous with and in addition to its rotating motion and means for forming a closed curved design substantially as described.

3. In a new and useful lathe, the combination of a rotatable shaft, an axle therein and rotatably connected therewith, a graded cam on the one end of said axle, an arm, pins therein, wheels on the ends of said pins and adapted to engage said cam, an adjustable lever adapted to alternately engage said pins and a rack adapted to hold said lever in a desired position, substantially as described.

4. In a new and useful lathe, the combination of a frame, a rotatable hollow shaft mounted therein, an axle within said shaft and adapted to rotate therewith and to reciprocate therein, a graded cam on the one end of the said axle, means on the other for securing a work-piece, a spring-governed sliding puppet adapted to coact with said axle, pins, means thereon for engaging said cam and a lever adapted to actuate said pins, substantially as described.

WILHELM SCHULTE.

Witnesses:
OTTO KÖNIG,
J. A. RITTERSHAUS.